(12) United States Patent
Jiang

(10) Patent No.: US 7,455,619 B2
(45) Date of Patent: Nov. 25, 2008

(54) CONTROL STRATEGY FOR AVOIDING TIP-IN NOISE IN A POWERSHIFT TRANSMISSION

(75) Inventor: Hong Jiang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 11/431,438

(22) Filed: May 10, 2006

(65) Prior Publication Data

US 2007/0265137 A1 Nov. 15, 2007

(51) Int. Cl.
*B60W 10/02* (2006.01)
(52) U.S. Cl. .................... 477/176; 477/904
(58) Field of Classification Search ........... 477/174, 477/176, 180, 904
See application file for complete search history.

(56) References Cited

U.S. PATENT DOCUMENTS

| 5,592,851 | A | 1/1997 | Bates et al. | |
|---|---|---|---|---|
| 6,443,025 | B2 | 9/2002 | Ohashi et al. | |
| 6,463,821 | B1 * | 10/2002 | Reed et al. | 74/330 |
| 6,490,944 | B1 | 12/2002 | Heinzel et al. | |
| 6,536,569 | B2 | 3/2003 | Nishimura | |
| 6,547,698 | B2 | 4/2003 | Inagawa et al. | |
| 6,599,216 | B1 | 7/2003 | Wafzig et al. | |
| 6,705,964 | B2 | 3/2004 | Nagai et al. | |
| 6,887,184 | B2 * | 5/2005 | Buchanan et al. | 477/174 |
| 6,926,638 | B1 | 8/2005 | Gimmler et al. | |
| 6,931,315 | B2 | 8/2005 | Ayabe et al. | |
| 7,249,537 | B2 * | 7/2007 | Lee et al. | 74/661 |
| 7,314,427 | B2 * | 1/2008 | Sakai et al. | 477/116 |
| 2004/0153232 | A1 | 8/2004 | Wada et al. | |
| 2004/0158382 | A1 | 8/2004 | Furuichi et al. | |
| 2004/0266584 | A1 | 12/2004 | Janson et al. | |
| 2005/0028625 | A1 | 2/2005 | Hatakeyama | |
| 2005/0096180 | A1 | 5/2005 | Wadas et al. | |

FOREIGN PATENT DOCUMENTS

| DE | 10048239 A1 * | 10/2001 |
|---|---|---|
| EP | 1460317 | 9/2004 |
| JP | 2005147312 A * | 6/2005 |

* cited by examiner

*Primary Examiner*—Ha D. Ho
(74) *Attorney, Agent, or Firm*—David B. Kelley; MacMillan, Sobanski & Todd, LLC

(57) ABSTRACT

In a motor vehicle including a power source, an accelerator pedal, a powershift transmission for producing a selected gear, first and second input shafts, a first input clutch for connecting the selected gear and the first input shaft to the power source, a second input clutch for connecting an alternate gear and the second input shaft to the power source, a method for controlling the transmission while the vehicle is coasting. Displacement of the accelerator pedal is monitored to identify a tip-out and a tip-in, and clutch slip is monitored. The first clutch is maintained in a stroked state following a tip-out and while clutch slip is less than a reference magnitude of clutch slip. When clutch slip exceeds the reference magnitude, the torque capacity of the first clutch is controlled in response to a driver demand torque. Engine torque is used to control clutch slip to the desired clutch slip and to produce a desired engine speed corresponding to the desired clutch slip.

20 Claims, 5 Drawing Sheets

| SYNCHRO | FIRST GEAR SET | SECOND GEAR SET | SYNCHRO |
|---|---|---|---|
| 42 | N 1 | 2 N 4 | 46 |
| 44 | N 3 N 5 | N 6 R | 48 |

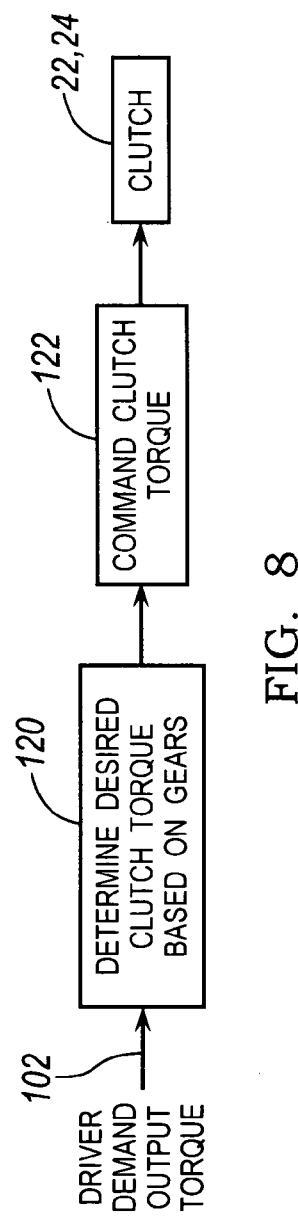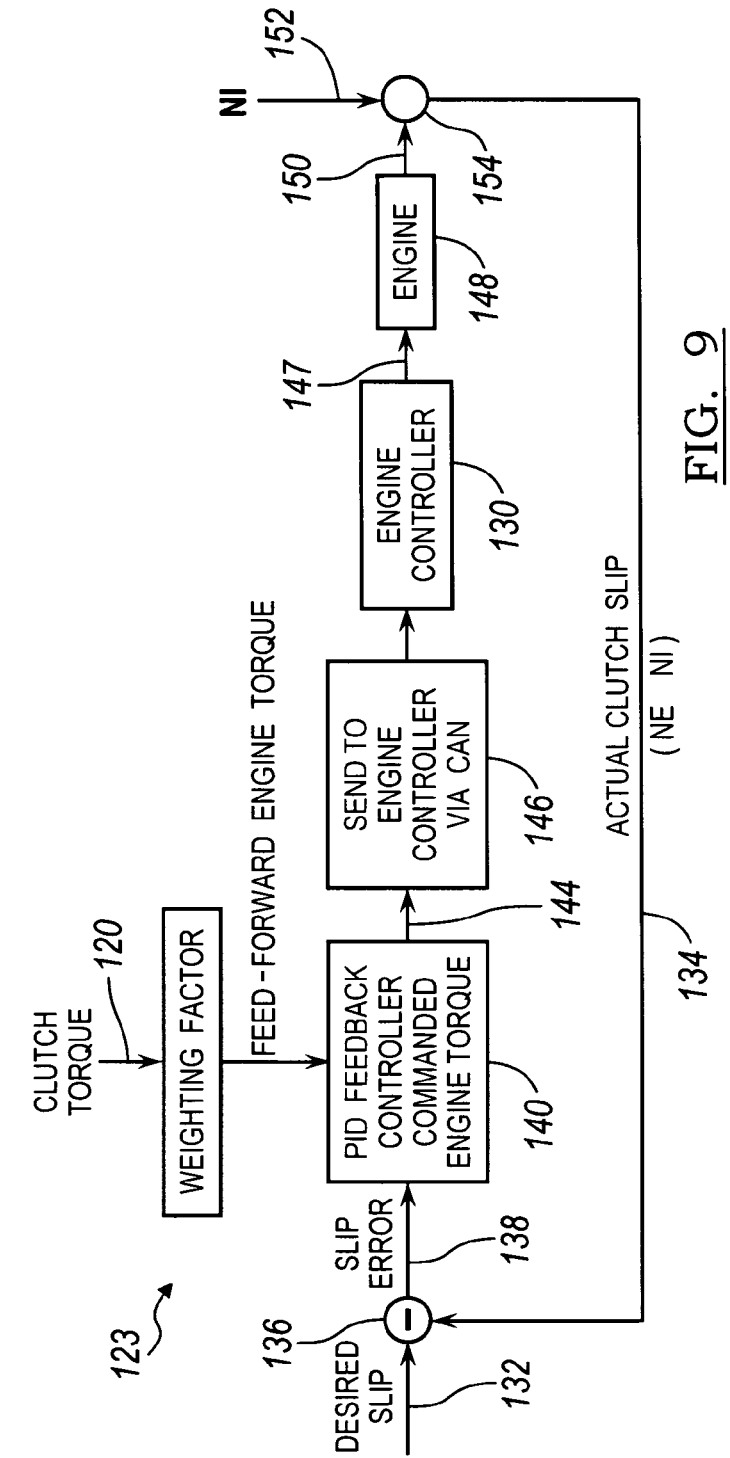

CONTROL STRATEGY FOR AVOIDING TIP-IN NOISE IN A POWERSHIFT TRANSMISSION

BACKGROUND OF THE INVENTION

The preferred embodiment relates to the control of gear changes in an automatic transmission for a motor vehicle. More particularly, it pertains to a control strategy for preventing noise in a powershift transmission due to a tip-in condition.

A dual clutch powershift transmission includes a first input shaft associated with the odd-numbered forward speed ratios, and a second input shaft 14 associated with the even-numbered forward speed ratios and reverse drive. A dual clutch mechanism produces a drive connection between an engine crankshaft and the first and second input shafts, alternately.

A conventional automatic transmission includes a torque converter, located in the power path between the engine shaft and the transmission input shaft, provides a fluid coupling between the engine and transmission. The torque converter provides a smooth transition between a power-off condition, in which power produced by the engine drives the transmission input shaft, and a power-off condition, in which the drive wheels transmit power to the engine. But a powershift transmission has no torque converter. Instead, the dual input clutch produces a mechanical drive connection between the engine and transmission.

In a powershift transmission tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

SUMMARY OF THE INVENTION

The tip-in control strategy eliminates tip-in clunk in the transmission, thereby providing a smooth tip-in/tip-out response. The control substantially improves the driveability during a parking lot maneuver, and it enables the transmission to perform like an automatic transmission instead of a manual transmission.

Engine torque is used to control engine speed at a large time rate of change when clutch slip has a relatively large absolute magnitude because the vehicle operator does not perceive a torque spike while the clutch is slipping.

When clutch slip has a low absolute magnitude, the rate of change of engine speed is low, thereby ensuring a smooth transition from negative slip to positive slip.

When clutch slip has relative large positive magnitude, smooth clutch engagement is achieved without an engine speed dip following clutch engagement.

The preferred embodiment relates to a motor vehicle that includes a power source, an accelerator pedal, a powershift transmission for producing a selected gear, first and second input shafts, a first input clutch for connecting the selected gear and the first input shaft to the power source, and a second input clutch for connecting an alternate gear and the second input shaft to the power source. A method for controlling the transmission while the vehicle is coasting includes monitoring displacement of the accelerator pedal to identify a tip-out and a tip-in, and monitoring clutch slip. The first clutch is maintained in a stroked state following a tip-out and while clutch slip is less than a reference magnitude of clutch slip. When clutch slip exceeds the reference magnitude, the torque capacity of the first clutch is controlled in response to a driver demand torque. Engine torque is used to control clutch slip to the desired clutch slip and to produce a desired engine speed corresponding to the desired clutch slip.

The scope of applicability of the present claims will become apparent from the following detailed description and drawings. It should be understood, that the description and specific examples, although indicating preferred embodiments of the invention, are given by way of illustration only.

DESCRIPTION OF THE DRAWINGS

FIG. 8 is schematic diagram of an open loop system for controlling clutch torque; and FIG. 9 is schematic diagram of a closed open loop system for controlling clutch slip using engine torque and feed forward assistance.

DESCRIPTION OF THE PREFERRED EMBODIMENT

Figures 1, 2:
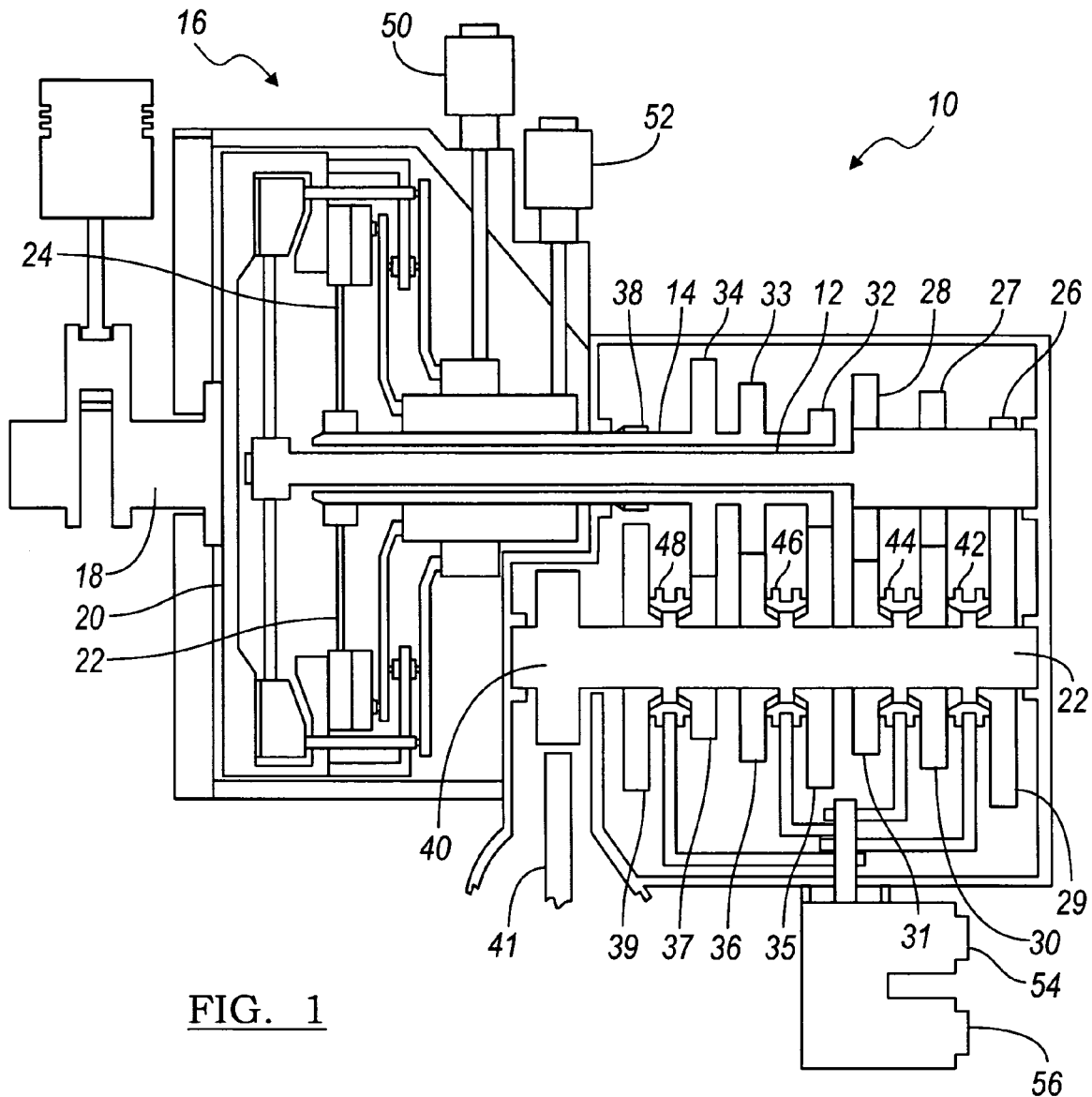
FIG. 1 is a schematic diagram of a twin clutch powershift automatic transmission to which the shift control strategy may be applied.
FIG. 2 is chart showing the coupler and the corresponding gears of FIG. 1 with which they are associated.

Referring now to FIG. 1, the powershift transmission 10 includes a first input shaft 12 associated with the odd-numbered forward speed ratios, and a second input shaft 14 associated with the even-numbered forward speed ratios and reverse drive. Input shaft 14 is a sleeve shaft surrounding input shaft 12. A dual clutch mechanism 16 produces a drive connection between the crankshaft 18 of an engine or another power source to the first and second input shafts 12, 14. The clutch mechanism 16 includes a flywheel 20, which is driveably connected to crankshaft 18 and is alternately driveably connected to and disconnected from input shaft 12 when clutch 22 is engaged and disengaged, respectively. Flywheel 20 is alternately driveably connected to and disconnected from input shaft 14 when clutch 24 is engaged and disengaged, respectively.

Preferably input shaft 12 is formed with pinions 26, 27, 28 for the first, second, and third speed ratios. Each pinion 26-28 is in meshing engagement with a corresponding gear 29, 30, 31, each gear being journalled on an output shaft 32. Similarly, the second input shaft 14 is preferably formed with pinions 32, 33, 34 for the second, fourth, and sixth forward speed ratios, and a reverse pinion 38. Each pinion 32-34 is in meshing engagement with a corresponding gear 35, 36, 37, each gear being journalled on output shaft 32. The reverse drive pinion 38 is in meshing engagement with a reverse idler (not shown), which meshes with a reverse output gear 39, journalled on the output shaft 32. A final drive pinion 40, secured to output shaft 32, meshes with a final drive gear 41, which transmits power to the axles of the driven wheels of the vehicle.

A synchronizer 42 alternately driveably connects the first speed gear 29 with the output shaft 32 when the sleeve of the synchronizer is displaced rightward from the neutral position shown in FIG. 1 and disconnects gear 29 from shaft 32 when the sleeve is in the neutral position. A second synchronizer 44 alternately connects and disconnects the third speed gear 30 and the fifth speed gear 31 with output shaft 32 depending on the axial position of the selector sleeve of synchronizer 44. Similarly, synchronizer 46 alternately connects and disconnects the second speed gear 35 and the fourth speed gear 36 with output shaft 32 depending on the axial position of the selector sleeve of synchronizer 46. Synchronizer 48 alternately connects and disconnects the sixth speed gear 37 and the reverse gear 39 to the output shaft depending on the axially position of its selector sleeve. In FIG. 1, all of the synchronizers 42, 44, 46, 48 are shown with their selector sleeves in the neutral position.

Clutches 22 and 24 are preferably normally open clutches, which may be actuated electro-mechanically, but those clutches may be normally-closed. A first, electro-mechanical actuator 50 engages and disengages clutch 22; a second actuator 52 engages and disengages clutch 24. The selector sleeves of synchronizers 42 and 44 are actuated by an electro-mechanical actuator 54; the selector sleeves of synchronizers 46 and 48 are actuated by an electro-magnetic actuator 56.

The transmission is controlled such that it produces a current or active gear upon engaging one of the input clutches 22, 24 after the selector sleeve of the corresponding synchronizer has been moved to a state that produces a drive connection between current gear and the output shaft 32. In addition, the transmission is controlled to produce a preselected gear, which is produced by changing the position of the selector sleeve of the corresponding synchronizer to produce a drive connection between the output shaft and the preselected gear and by disengaging the clutch 22, 24 associated with the preselected gear.

The chart of FIG. 2 shows that the sleeve of synchronizer 42 moves rightward from the neutral position to connect the first gear 29 to the output shaft 32. The sleeve of synchronizer 44 moves rightward from the neutral position to connect third gear 30 to the output shaft 32 and moves leftward from the neutral position to connect the fifth gear 31 to the output shaft. The sleeve of synchronizer 46 moves rightward from the neutral position to connect gear 35 to the output shaft 32 and moves leftward from the neutral position to connect the fourth gear 36 to the output shaft. The sleeve of synchronizer 48 moves rightward from the neutral position to connect the sixth gear 37 to the output shaft, and it moves leftward from the neutral position to driveably connect the reverse gear 39 to the output shaft.

Figure 3:
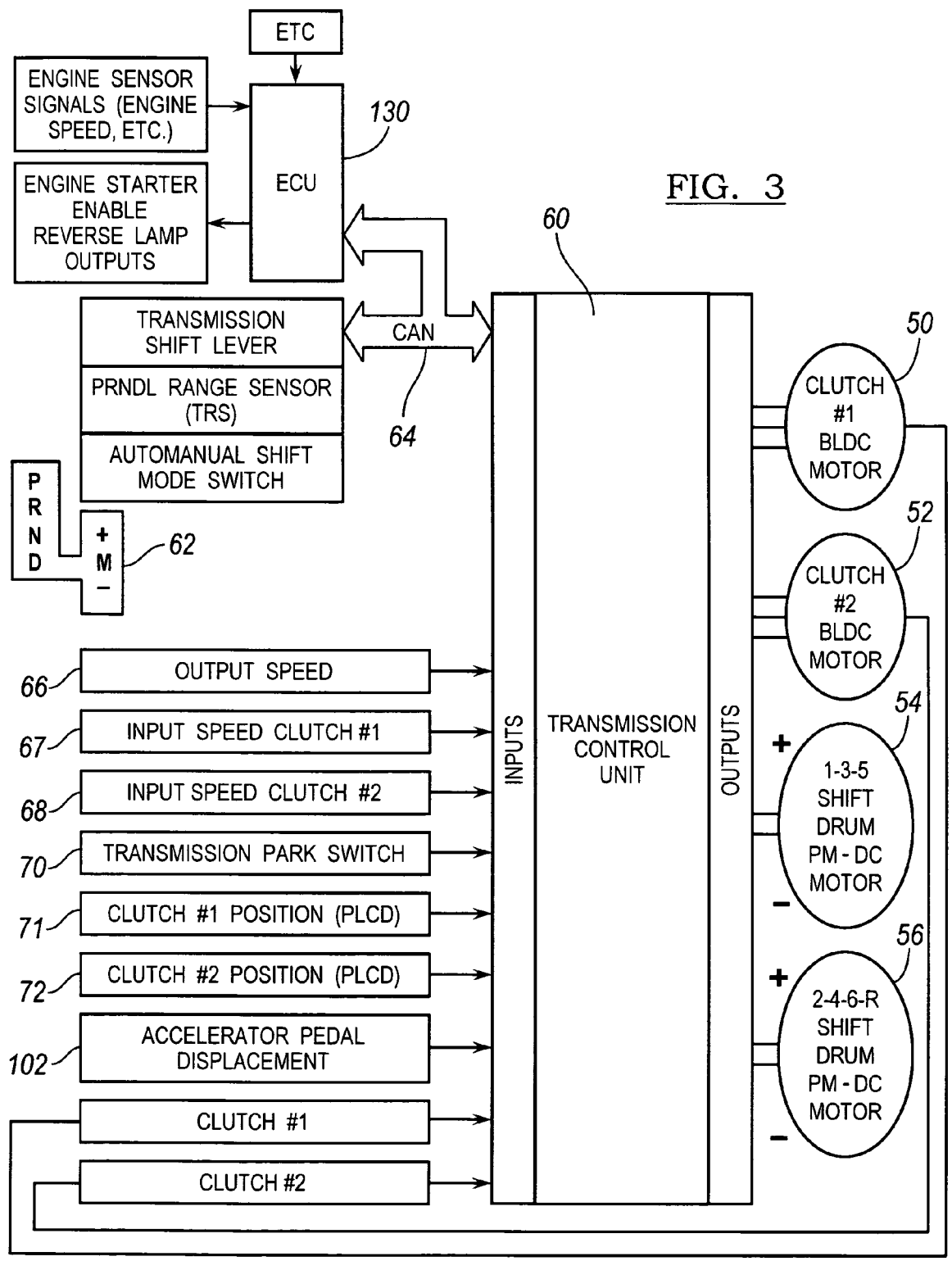
FIG. 3 is a schematic diagram of an electronic system for controlling the transmission following a change-of-mind event.

FIG. 3 shows the arrangement of an electronic system for controlling the actuation of clutches 22 and 24 through operation the clutch actuators 50, 52, and for actuating the synchronizers 42, 44, 46, 48 through operation on the synchronizer actuators 54, 56. A transmission control unit (TCU) 60, which is accessible to electronically stored, coded algorithms, responds to the various inputs, executes the control algorithms, and produces electronic command signal to the actuators 50, 52, 54, 56. The position or displacement of the actuators is carried back as input to the TCU 60. The position of a transmission shift lever 62 is communicated on CAN 64 to the TCU input, and communications among various sensors, the TCU and actuators is carried on the CAN. Speed sensors 66, 67, 68 produce electronic signals representing the speed of output 32, the speed of input 12, and speed of input 14. Other TCU inputs include state of a transmission park switch 70, the position or state 71 of clutch 22, and the engaged or disengaged state 72 of clutch 24. The magnitude of displacement of an accelerator pedal 102 is another TCU input.

Figure 4:
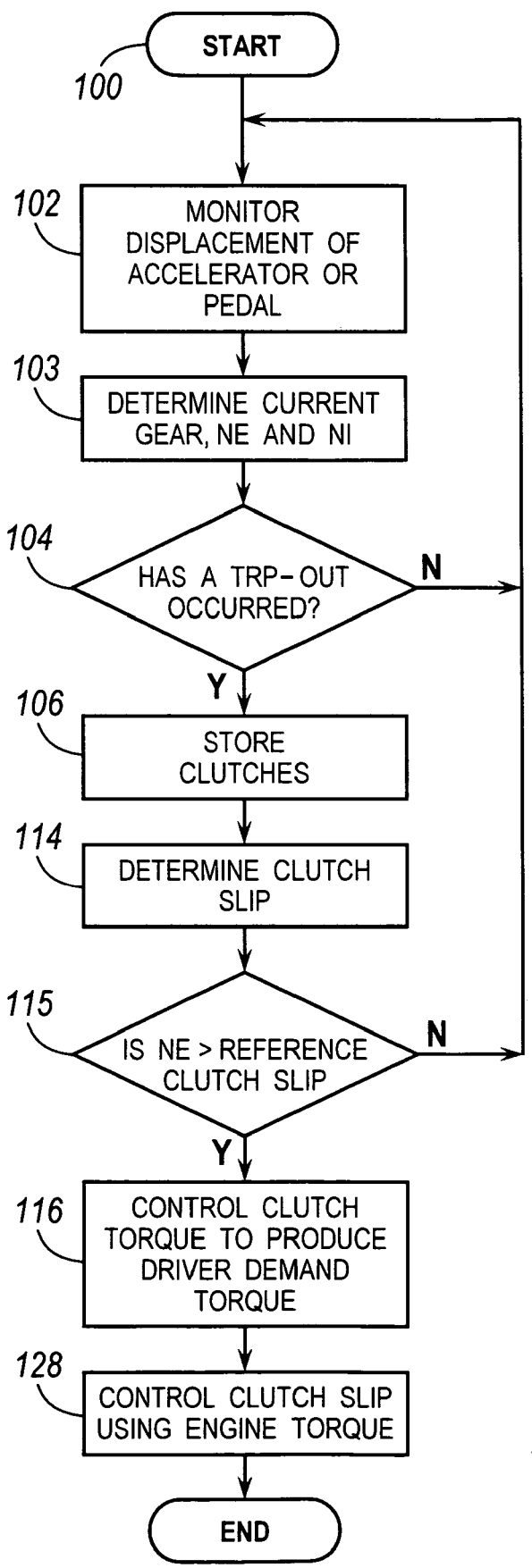
FIG. 4 is a logic flow diagram illustrating control of the engine and clutches during a tip-in following a coast condition and FIG. 5 is a graph showing the variation of engine speed and input shaft speed vs time.

FIG. 4 is a logic flow diagram illustrating the steps for controlling the power source, transmission 10, and clutches 22, 24 during a tip-in of the accelerator pedal 102 by the vehicle operator while the transmission is operating in a current gear. Although the control is described with reference to an internal combustion engine, the power source may be an IC engine, electric motor, or an engine and motor in combination. The control strategy according to this invention, which begins at step 100, repetitively monitors the displacement of the accelerator pedal at step 102. The control repetitively monitors an output signal from the accelerator pedal displacement sensor 102 to determine whether the pedal is released or depressed and the degree of its displacement Displacement of the accelerator pedal from a released position is represented by counts produced electronically by sensor 102 and supplied as input to the TCU 60.

At step 103, the control repetitively determines the current gear, engine speed (NE), and input shaft speed (NI).

When the test at step 104 indicates that the driver has performed a tip-out, engine speed is allowed to drop to engine idle speed, which is below the speed of either input shaft 12, 14. Clutch slip, which is the difference between engine speed and input shaft speed (NE−NI), is then negative, and the vehicle is coasting.

At step 106, clutches 12, 14 are stroked, i.e., the torque capacity of both clutches is reduced to a low magnitude, preferably to the range 0-2.0 N-m, by actuators 50, 52, and each clutch is set for immediate engagement upon minimal displacement of the respective actuator.

Figure 5:
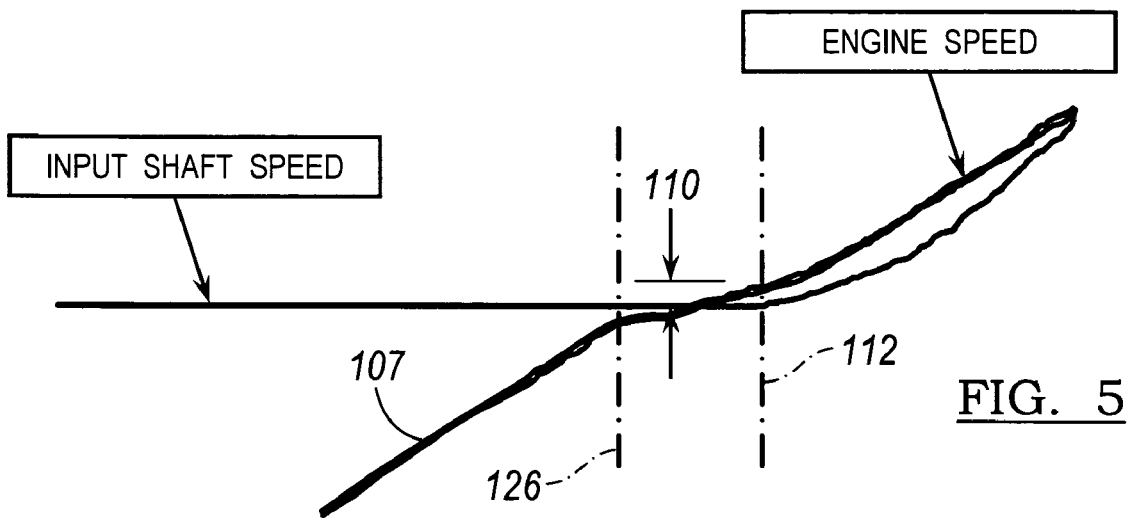

FIG. 5 shows a desired engine speed variation 107, and input shaft speed variation. The abscissa of the graphs of FIGS. 5-7 is time.

Figure 6:
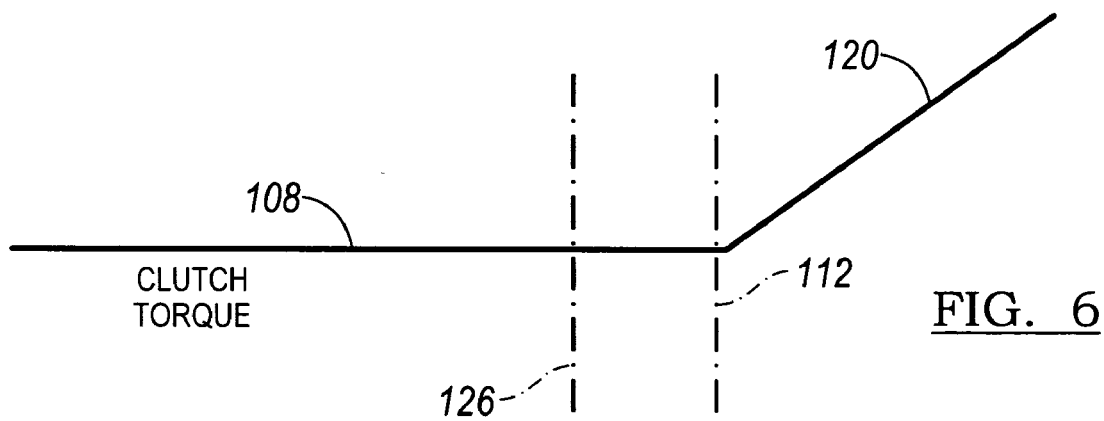
FIG. 6 is a graph showing the variation of clutch torque vs time.
Figure 7:
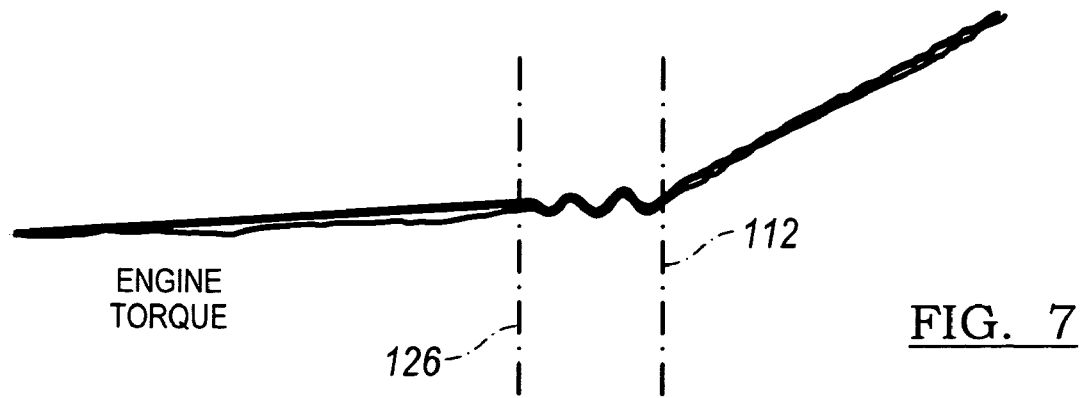
FIG. 7 is a graph showing the variation of engine torque vs time.

FIG. 6 shows the variation of engine torque vs time. In order to eliminate the tip-in clunk that would occur if the driver tips-in while the vehicle is coasting, the clutches 22, 24 remain stroked and clutch torque 120 stays at a minimum torque 108, about 2 N-m, until engine speed exceeds input shaft speed by a programmable, reference clutch slip 110, about +50 rpm. The FIG. 5 indicates at 112 when clutch slip reaches +50 rpm, the reference clutch slip 110.

At step 114, clutch slip is monitored repetitively. If the test at step 115 is true, indicating that clutch slip is equal to or greater than the reference clutch slip 110, at step 116 the magnitude of clutch torque is controlled to the magnitude of driver demand torque, preferably using open loop control.

FIG. 8, illustrates a preferred open loop controller 118 for controlling clutch torque based on driver demand torque. The controller 118 receives an input signal representing driver demand output torque, such as the signal representing accelerator pedal displacement 102, and determines at 120, with reference to the gear to be produced by the synchronizers 42-48 of transmission 10 upon engagement of a clutch 22, 24, the magnitude of driver demand torque. At 122, controller 118 determines the magnitude of commanded clutch torque corresponding to the driver demand torque. A signal representing the commanded clutch torque is transmitted to the actuating motor 50, 52 that corresponds to the appropriate clutch 22, 24 and gear. Torque capacity of that clutch is then determined by the commanded clutch torque signal.

Engine torque (NT) is controlled to produce the engine speed profile of FIG. 5, preferably using a closed loop controller 123 with feed forward assistance, as illustrated in FIG. 9. The desired engine speed is determined based on the magnitude of current clutch slip. When the magnitude of clutch slip has relatively large negative values, preferably less than about −50 rpm, as illustrated in the range ending at 126 in FIG. 7, the desired rate of change of engine speed is large, because the absolute value of clutch slip is large. While clutch slip has a relatively large negative magnitude, feed forward engine torque control, which principally references electronic throttle control (ETC) as an input, is used to produce the desired engine speed.

When the magnitude clutch slip is relatively close to zero, preferably between −50 rpm and +50 rpm as illustrated in the range starting at 126 and ending at 112 in FIG. 7, the desired rate of change of engine speed is controlled to be small enough to ensure a smooth transition from negative slip to positive slip. While clutch slip is in a range that is relatively close to zero, closed loop engine torque control, which references ETC, engine spark timing and air-fuel ratio as inputs, is used to produce the desired engine speed.

When clutch slip has relatively large positive magnitudes, preferably equal to or greater than about +50 rpm as illustrated in the range starting at 112 in FIG. 7, the desired rate of change of engine speed is large. While slip has a relatively large positive magnitude and until the appropriate clutch 22, 24 is locked and fully engaged, engine torque is controlled by the closed loop controller 123, which principally references electronic throttle control (ETC) as an input, so that engine speed follows the desired engine speed profile shown in FIG. 5 and smooth clutch engagement is achieved without an engine speed dip following engagement of the clutch 22, 24 that will produce the desired gear. Clutch torque continues to be controlled based on the driver demand output torque.

Referring again to the control logic diagram of FIG. 4, at step 128 the closed loop control of FIG. 9 uses engine torque with feed forward assistance to clutch slip. Tight closed-loop control is used because the output of the engine controller 130, which is engine torque, will not affect vehicle drivability while the clutches 22, 24 are slipping while stoked.

The desired engine speed is a stored function of pedal position and vehicle speed. The desired clutch slip 132 is calculated from the difference (desired engine speed−current input shaft speed). A signal representing current clutch slip 134 is fed back to junction point 136, where the clutch slip signal is compared to the desired slip signal to produce clutch slip error 138, which is supplied as input to a PID feedback controller 140. The desired clutch torque 120, determined as described above with reference to FIG. 7, is also supplied as input to controller 140 after applying a weighting factor. The weigh applied to clutch torque may be about 1.0 if conventional operation is desired, or it may be about 0.90 if sporty operation is an objective.

Controller 140 produces a signal representing commanded engine torque 144, which is communicated at 146 to engine controller 130 via a CAN. Engine controller 130 controls operating parameters of the engine 148, such as spark timing, air-fuel mixture, etc., in response to the commanded engine torque to produce the desired engine torque 147. Engine speed resulting from the desired engine torque with the engine operating at zero load is changed. A signal 150 representing the updated engine speed and a signal 152 representing current input shaft speed are compared at junction point 154. A signal 134 representing actual clutch slip is produced at junction point 154 and is fed back as input to junction point 136 to update slip error 138.

In accordance with the provisions of the patent statutes, the preferred embodiment has been described. However, it should be noted that the invention can be practiced otherwise than as specifically illustrated and described without departing from its spirit or scope.

What is claimed is:

1. A method for controlling a powershift transmission for a motor vehicle while coasting, comprising:
   (a) monitoring an accelerator pedal to identify a tip-out;
   (b) maintaining a stroke state of a clutch following the tip-out and while clutch slip is less than a reference magnitude;
   (c) controlling a torque capacity of the clutch in response to a driver demand torque when clutch slip exceedes the reference magnitude; and
   (d) using engine torque to control clutch slip.

2. The method of claim 1 further comprising:
   disposing the transmission for operation in a selected gear; and
   wherein step (b) further comprises engaging an input clutch that connects a power source and the selected gear.

3. The method of claim 1 wherein step (b) further comprises:
   allowing an engine speed to decrease to idle speed following the tip-out.

4. The method of claim 1 wherein step (b) further comprises:
   maintaining an input clutch at a predetermined toque capacity that is substantially equal to zero torque.

5. The method of claim 1 wherein step (c) further comprises:
   controlling the torque capacity of the clutch in response to the driver demand torque represented by accelerator pedal displacement.

6. The method of claim 1 wherein step (c) further comprises:
   using an open loop to control the torque capacity of the clutch in response to the driver demand torque represented by accelerator pedal displacement.

7. The method of claim 1, wherein step (f) further comprises:
   while clutch slip is less than or equal to a predetermined negative clutch slip, using engine torque to control clutch slip such that a time rate of increase of engine speed is at a high rate.

8. The method of claim 1, wherein step (f) further comprises:
   while clutch slip is greater than a predetermined negative clutch slip and equal to or greater than a predetermined positive clutch slip, using engine torque to control clutch slip such that a time rate of change of engine speed is at a rate that avoids tip-in clunk during a transition between the negative clutch slip and and positive clutch slip.

9. The method of claim 1, wherein step (d) further comprises:

while clutch slip is less than or equal to a predetermined negative clutch slip, using engine torque to control clutch slip such that a time rate of increase of engine speed is at a first rate; and while clutch slip is greater than said predetermined negative clutch slip and equal to or greater than a predetermined positive clutch slip, using engine torque to control clutch slip such that the time rate of change of engine speed is at a second rate that is lower than the first rate.

10. The method of claim 1, wherein step (f) further comprises:

while clutch slip is greater than a predetermined positive clutch slip, using engine torque to control clutch slip such that no reduction in engine speed occurs upon increasing the torque capacity of said at least one clutch above the clutch torque capacity corresponding to the stroked state.

11. The method of claim 1, further comprising:
determining desired engine speed from a function relating pedal position and vehicle speed; and
determining desired clutch slip from a difference between the desired engine speed and current input shaft speed.

12. A method for controlling a powershift transmission for a motor vehicle while coasting, comprising:
(a) monitoring displacement of an accelerator pedal to identify a tip-out and a tip-in;
(b) maintaining a stroke state of a first input clutch following the tip-out and while clutch slip is less than a reference magnitude;
(c) controlling a torque capacity of the first input clutch in response to a driver demand torque when clutch slip exceeds the reference magnitude; and
(d) using engine torque to control clutch slip; and
(e) engaging the first input clutch following the tip-in.

13. The method of claim 12, wherein step (d) further comprises:

while clutch slip is less than or equal to a predetermined negative clutch slip, using engine torque to control clutch slip such that a time rate of increase of engine speed is a relatively high rate.

14. The method of claim 12, wherein step (d) further comprises:

while clutch slip is greater than a predetermined negative clutch slip and equal to or greater than a predetermined positive clutch slip, using engine torque to control clutch slip such that a time rate of change of engine speed is at a rate that avoids tip-in clunk during a transition between the negative clutch slip and the positive clutch slip.

15. The method of claim 12, wherein step (d) further comprises:

while clutch slip is less than or equal to a predetermined negative clutch slip, using engine torque to control clutch slip such that a time rate of increase of engine speed is at a first rate; and while clutch slip is greater than said predetermined negative clutch slip and equal to or greater than a predetermined positive clutch slip, using engine torque to control clutch slip such that the time rate of change of engine speed is at a second rate that is lower than the first rate.

16. The method of claim 12, wherein step (e) further comprises:

while clutch slip is greater than a predetermined positive clutch slip, using engine torque to control clutch slip such that no reduction in engine speed occurs upon increasing the torque capacity of the first clutch above the clutch torque capacity corresponding to the stroked state.

17. A system for controlling a powershift transmission for a motor vehicle while coasting, comprising:
a power source;
an accelerator pedal;
a powershift transmission disposed for operation in a current gear;
first and second input shafts;
a first input clutch for connecting a selected gear and the first input shaft to the power source;
a controller for monitoring displacement of the accelerator pedal to identify a tip-out, maintaining the first clutch in a stroked state following the tip-out and while clutch slip is less than the reference magnitude, controlling the torque capacity of the first clutch in response to a driver demand torque while clutch slip exceeds said reference magnitude, using engine torque to control clutch slip.

18. The system of claim 17 wherein the controller further comprises:
an open loop for determining a desired clutch torque based on the selected gear and the driver demand torque, and for producing a torque capacity of the first clutch corresponding to the desired clutch torque.

19. The system of claim 17 wherein the controller further comprises:
a first junction point for comparing a signal representing an updated engine speed and a signal representing current input shaft speed, and producing a signal representing actual clutch slip;
a second junction point for comparing a signal representing actual clutch slip and desired clutch slip, and producing a signal representing clutch slip error;
a PID controller responsive to clutch slip error and clutch torque capacity for producing a signal representing a commanded engine torque, and for producing an engine torque corresponding to the commanded engine torque, and an engine speed corresponding to the engine torque.

20. The system of claim 17 wherein the controller is further configured to engaging the first input clutch following a tip-in.

* * * * *